United States Patent [19]

Gloor et al.

[11] 4,298,249

[45] Nov. 3, 1981

[54] ELECTRO-OPTICAL DISPLAY HAVING AN IMPROVED REFLECTOR AND METHOD OF MAKING

[75] Inventors: Ernst Gloor; Meinolph Kaufmann, both of Fislisbach, Switzerland; Allan R. Kmetz, Murray Hill, N.J.

[73] Assignee: BBC Brown, Boveri & Company, Ltd., Baden, Switzerland

[21] Appl. No.: 66,696

[22] Filed: Aug. 15, 1979

[30] Foreign Application Priority Data

Dec. 20, 1978 [CH] Switzerland ............... 12925/78

[51] Int. Cl.³ .................................... G02F 1/133
[52] U.S. Cl. ............................ 350/338; 350/339 D; 350/345; 350/452
[58] Field of Search ............ 350/338, 345, 339 D, 350/211, 452

[56] References Cited

U.S. PATENT DOCUMENTS

| | | | |
|---|---|---|---|
| 3,728,007 | 4/1973 | Myrenne et al. | 350/338 X |
| 3,734,598 | 5/1973 | Aiken | 350/338 |
| 3,846,014 | 11/1974 | Aldrich et al. | 350/338 |
| 3,881,809 | 5/1975 | Fergason et al. | 350/338 |
| 3,891,309 | 6/1975 | Bonne | 350/338 |
| 4,026,637 | 5/1977 | Yamazaki | 350/338 X |
| 4,042,294 | 8/1977 | Billings et al. | 350/338 X |
| 4,185,895 | 1/1980 | Stephens et al. | 350/338 X |

*Primary Examiner*—Edward S. Bauer
*Attorney, Agent, or Firm*—Oblon, Fisher, Spivak, McClelland & Maier

[57] ABSTRACT

An electro-optical display composed of two plates which enclose a display medium and a reflector located on the rear plate. The reflector consists of a thermoplastic material and consists of reflecting surface strips, inclined to the display plane, which reflect incident light beams into the eye of an observer. The surface strips which can be semi-transparent and/or diffusely reflecting are inclined with respect to the display plane at an angle α and extend rectilinearly in at most two different directions over the surface of the reflector. The angle of inclination α is either the same for all surface strips and has a value of between 20° and 40°, or decreases progressively from an outermost surface strip to the subsequent surface strip. The reflector strips are produced by milling, embossing or injection molding of a suitable thermoplastic material.

10 Claims, 9 Drawing Figures

$$\alpha = \frac{90 - \delta}{2}$$

ELECTRO-OPTICAL DISPLAY HAVING AN IMPROVED REFLECTOR AND METHOD OF MAKING

BACKGROUND OF THE INVENTION

1. Field of the Invention

The invention relates to an electro-optical display formed by a pair of planar electrode coated parallel plates between which is disposed a display medium.

2. Description of the Prior Art

Such an elecro-optical display is known from German Offenlegungschrift No. 2,655,166.

Conventional reflective display, such as, say, liquid crystal displays, frequently lose their brightness and hence readability in an unacceptable way as soon as they are mounted vertically and are read, in that position, by an observer, whose eyes are usually at approximately the height of the display. The reason for this abrupt loss of brightness of the conventional reflective displays resides in the fact that these displays in general only possess a planar, mirror-like or slightly diffuse relfector without special structure, and this type of relfector reflects the light, which in general is incident from above, onto the ground instead of towards the observer.

Proposals as to how, in quite specific types of displays, light incident from above could be redirected into the eye of the observer are known from German Offenlegungsschrift No. 2,512,548, U.S. Pat. No. 3,768,887 and U.S. Pat. No. 3,838,909. However, all these solutions are based on types of displays which must possess, at the top, an additional, horizontal window for the entry of light. However, such a window, together with the frequently involved path of the beam, and the partly space-consuming reflectors and deviating plates, prevents a flat construction of the display. For this reason, such solutions are out of the question for a modern display, where flat, space-saving displays are always demanded.

German Offenlegungsschrift No. 2,655,166 discloses a solution by means of which electro-optical displays can be constructed without an additional horizontal window for the incident light. However, it is a disadvantage of this solution that because of the prism deviating plate required at the front of the display, the front again requires more space. Further it should be mentioned, in connection with this solution, that a front plate of this type, provided with prisms, undoubtly suffers rapid soiling and can easily cling and suffer abrasion.

SUMMARY OF THE INVENTION

Accordingly, the objects of this invention are to provide a novel electro-optical display, preferably for vertical mounting, of the type mentioned above, which, without addition of light entry windows, redirects the light, incident from above, into the eye of the observer, the eye being at approximately the same height as the display, shows undistorted images without the danger of dazzling of the observer, and permits a flat construction, with the display according to the invention not entailing any increased hazard of soiling or damage.

These and other objects are achieved according to the invention by providing a new and improved electro-optical display composed of parallel and planar front and rear cell plates, each of which is provided with electrode coatings, and between which is disposed a display medium, wherein at least the front plate is transparent. The display further includes a thermoplastic reflector located on the rear cell plate and formed with a light reflecting structure including plural reflecting strips each inclined at an angle α with respect to the plane of the plates and extending rectilinearly in at most two different directions over the surface of the reflector. The angle of inclination α is either the same for all surface strips and has a value of between 20° and 40°, or decreases progressively from an outermost surface strip to the subsequent surface strip from an initial value $\alpha_o$ to a final value $\alpha_E$, with the relation $(\alpha_o-(\alpha_o/5))\leq \alpha \leq (\alpha_o+(\alpha_o/5))$ always applying.

The invention further includes a novel process for the manufacture of the above-described display, wherein the reflector is produced by either milling or embossing the plural reflector strips into a sheet of thermoplastic material or by injection of a heated thermoplastic material into a mold casting cavity having a casting surface exhibiting the shape of the reflecting strips.

It is one of the advantages of the present invention that the electro-optical display according to the invention can also be manufactured inexpensively and is distinguished by a rather large viewing angle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
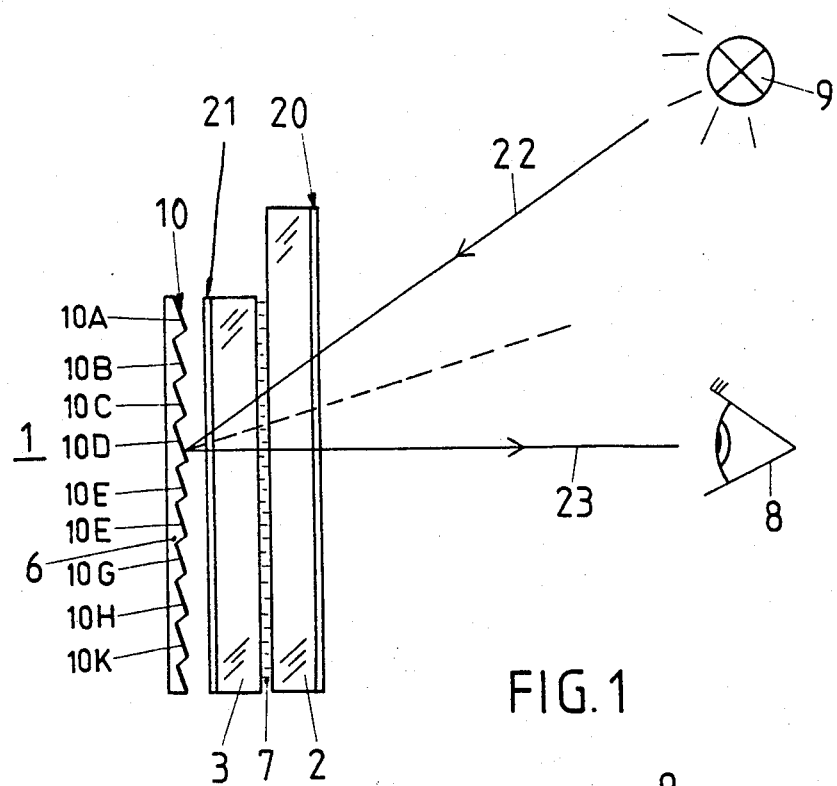
FIGS. 1, 2, 3 and 4 are cross-sectional views of several display embodiments according to the invention.
Figure 2:
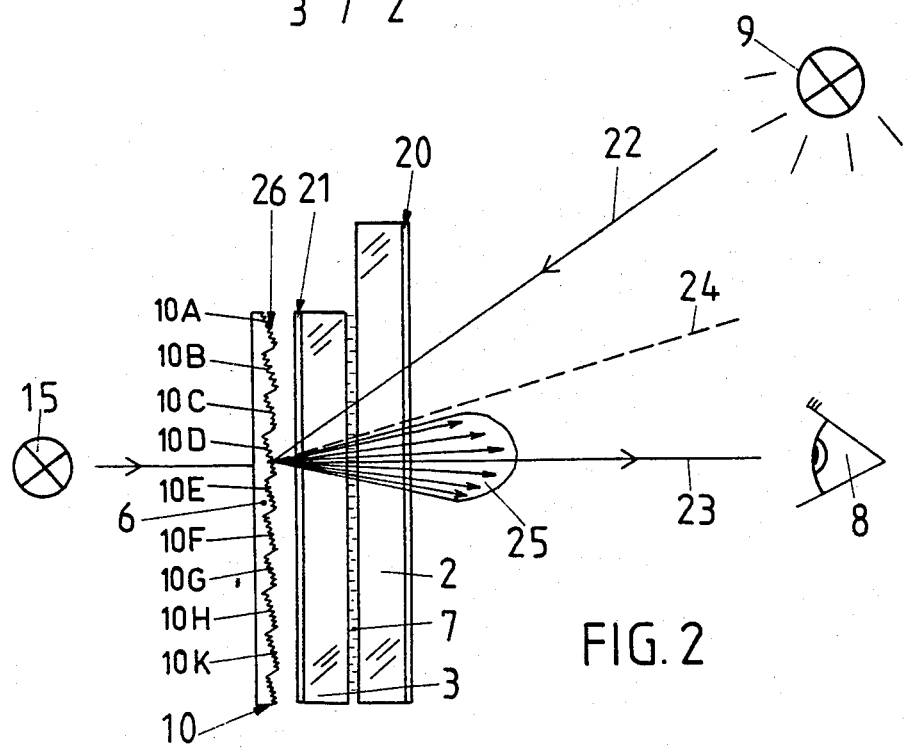

Referring now to the drawings, wherein like reference numerals designate identical or corresponding parts throughout the several views, and more particularly to FIGS. 1 and 2, thereof, there is shown typical illumination conditions, with a light source 9 representing the maximum of the luminous intensity of the light which in general is incident from above. The electro-optical display 1 according to the invention is shown in the vertical position which is particularly important for the present invention. The display 1 consists of two mutually parallel transparent plates, a front plate 2, which faces the observer 8, and a rear plate 3, which faces away from the observer 8. These plates 2, 3 can be made of glass or any other suitable, transparent material. In the narrow interspace between these two plates 2, 3 there is disposed an optically changeable medium, the display medium 7. In the case of a liquid display device, the display medium used is a liquid crystal substance which is retained air-tightly between the plates 2,3 by a connecting edge strip, not shown. For some types of liquid crystal displays, such as, for example, nematic twist cells, it is necessary to attach polarizers 20, 21 to the plates 2, 3.

In order to prevent the light incident from above or from the side, and indicated here, in FIGS. 1 and 2, by the incident light beam 22, from being reflected downwards against the ground, there is provided, in accordance with the fundamental concept of the present invention, on the side of the display medium 7 which faces away from the observer 8, that is to say in the present case behind the rear plate 3, a plane reflector 6 which is inclined to the display at an angle $\alpha$ and possesses reflecting surface strips 10A to 10K. The structure 10 formed by these surface strips 10A to 10K faces, as shown in FIGS. 1 and 2, the rear plate 3 and reflects the light, coming from the light source 9, into the eye of the observer 8. In the case of a reflector with a uniformly plane reflecting surface facing the rear plate 3, virtually no light from the light source 9 would be able to enter the eye of the observer 8. However, with a reflector 6 as shown schematically in FIG. 1, excellent visibility of the display information is achieved as a result of the structure 10 according to the invention, since this structure 10 reflects the light beams 22, incident from the light source 9, as reflected light beams 23.

In FIGS. 2 to 9 which follow, parts which correspond to FIG 1 and have already been discussed are marked with the same reference numerals and will not be separately described again if their functions follows from the particular context.

In FIG. 2, the reflector 6 is provided with slightly diffusely reflecting surface strips 10A to 10K. The diffusely reflecting construction of the structure 10, indicated in FIG. 2 by the diffusely reflecting surface 26, is provided for various reasons. Firstly, it is intended to ensure reliably that the observe 8 cannot see the mirror image of the light source 9. Further, the angle of viewing can be substantially increased as a result of the diffusely reflecting form of the structure 10. This is necessary since the invention is also intended for cases where the position of the observer 8 or of the incident light varies. As indicated by the cone of rays 25 shown in FIG. 2, a variation in the height of the observer hardly impairs the visibility of the display over relatively large angles of viewing.

FIG. 2 also shows the very important variant wherein the surface strips are of semi-transparent construction. In that case, the display according to the invention can also be operated with transmitted light, as shown by the illumination source 15.

Figure 3:
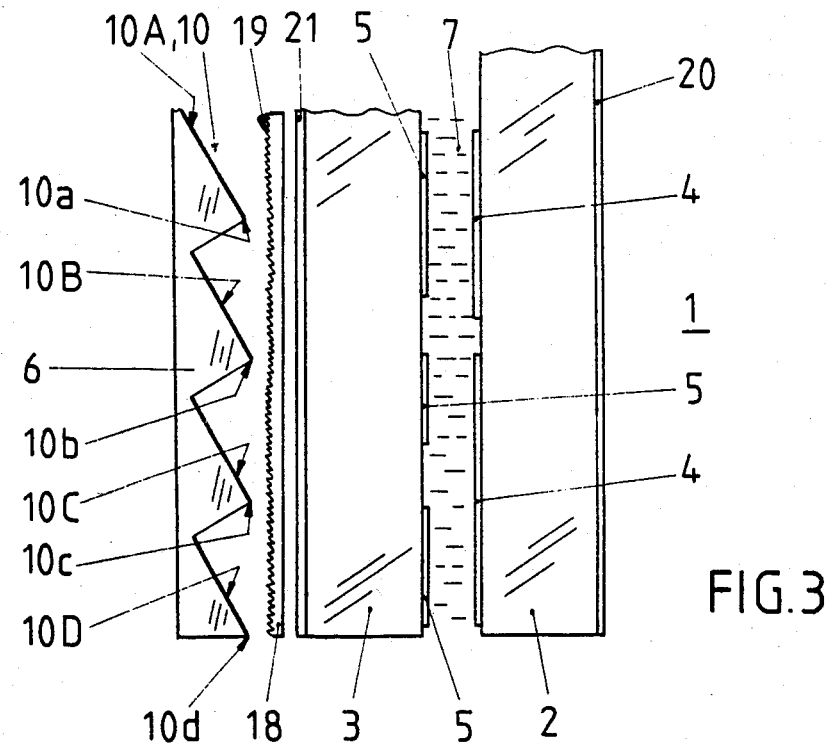
Figure 4:
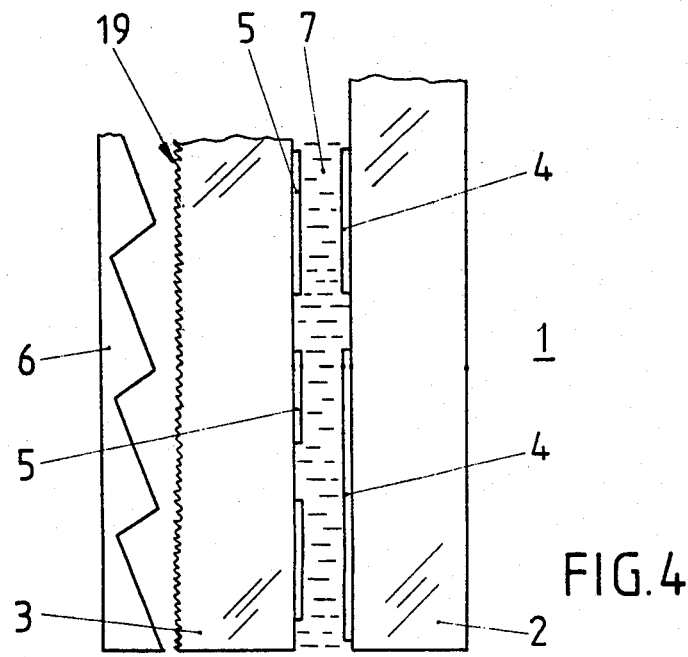

FIG. 3 shows, on an enlarged scale, a further example of display 1 according to the invention. In this figure, the construction of the reflector 6 according to the invention can be seen particularly clearly. Its structure 10, on the side facing the rear plate 3, exhibits individual surface strips 10A to 10D. In the example shown in FIG. 3, the edges 10a and 10d of the surface strips 10A to 10D are all at the same distance from the rear plate 3. In FIG. 3, furthermore, the surface strips 10A to 10D have smooth surfaces which face the light and are of reflecting construction. Behind the reflector 6 and the rear plate 3 is provided a further plate 18 made of transparent material and having a diffusely scattering surface 19. As a result, the reflector 6 can be manufactured particularly simply and cheaply. Nevertheless, however, a visible mirror image, dazzling and too narrow a viewing angle are avoided. The example of FIG. 3 is particularly simple to manufacture because the manufacture of the plate 18 is also very inexpensive. Further, it has the advantage that polarizers 20, 21 can readily be provided on the plates 2, 3. This, as is known, is necessary with most types of liquid crystal displays. Further, FIGS. 3 and 4 show the electrodes 4, 5 mounted on the inner surfaces of the plates 2, 3. By applying an electrical potential, an electrical field can be produced selectively at various regions of the display medium 7, whereby the display optical properties can be varied corresponding to the information to be displayed.

FIG. 4 shows a further possible embodiment of display 1 according to the invention which dispenses with the plate 18 additionally used in FIG. 3, despite the fact that the reflector 6 is constructed as in FIG. 3, that is to say without diffusely scattering surfaces. In order nevertheless to produce the effect of a diffuse reflector, the side of the rear plate 3 with faces the reflector 6 is here, in FIG. 4, constructed with a diffusely scattering surface 19. With this variation it is possible above all to achieve not only inexpensive manufacture, but also a very flat construction. If a liquid crystal is used for the display medium 7, it would admittedly be necessary to use operating forms which at least manage without a polarizer 21 on the rear face, for example the guest-host effect.

Figure 6:
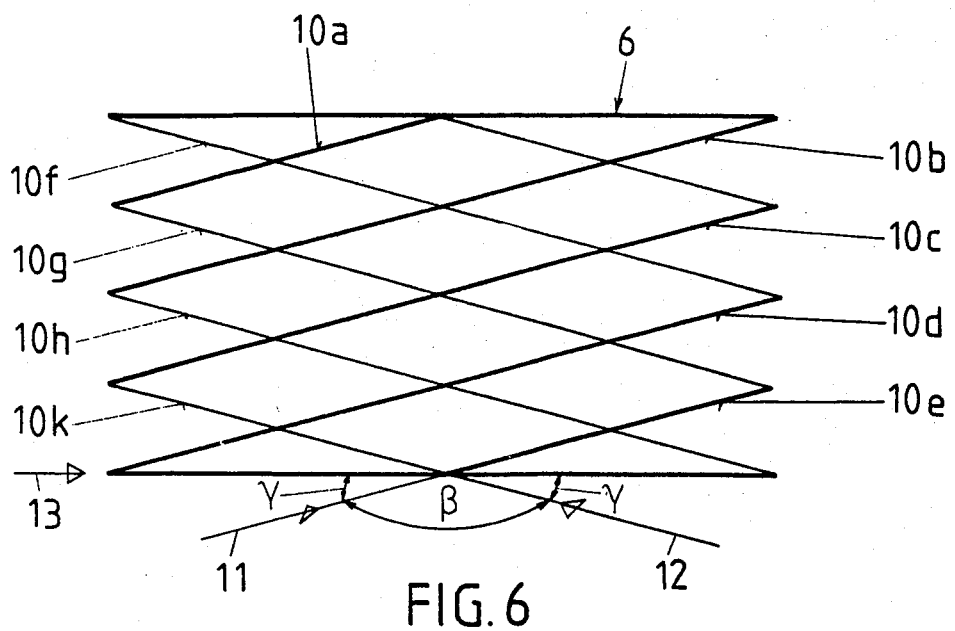
FIG. 6 is a plan view of the reflector shown in FIG. 5.
Figure 5:
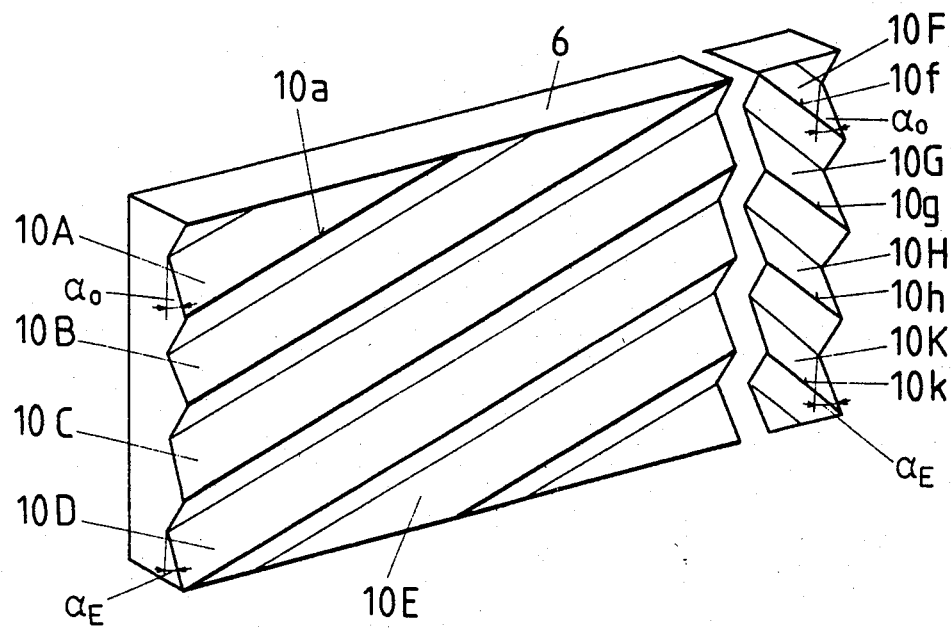
FIG. 5 is a perspective view of one embodiment to the invention.

FIG. 6 is a plan view of the example of a reflector 6 represented in FIG. 5. However, in FIG. 5 the surface strips 10A to 19K are not shown one inside the other, as in FIG. 6, but instead, for ease of appreciation, separated according to the two directions 11 and 12. As can be seen from FIGS. 5 and 6, in this example of a reflector 6 according to the invention the surface strips 10A to 10K and the edges 10a to 10k do not all exhibit the same direction. Rather, amongst these the surface strips 10A, 10B, 10C, 10D and 10E and the edges 10a to 10e point in the same direction 11, which direction forms an angle $\gamma$ with the horizontal direction 13. On the other hand, the surface strips 10F, 10G, 10H and 10K and the edges 10f, 10g, 10h and 10k point in the direction 12, which differs from the direction 11 by an angle $\beta$, for which the relationship $0°\leq\alpha\leq180°$ applies. Correspondingly, the following then applies to the angle $\gamma:0°\leq\gamma\leq90°$. With such a "crosswise structure" of the surface strips, a further advantageous adaptation of the display according to the invention to, on the one hand, the prevailing location light conditions and, on the other hand, to the position of the observer is achieved.

Figure 7:
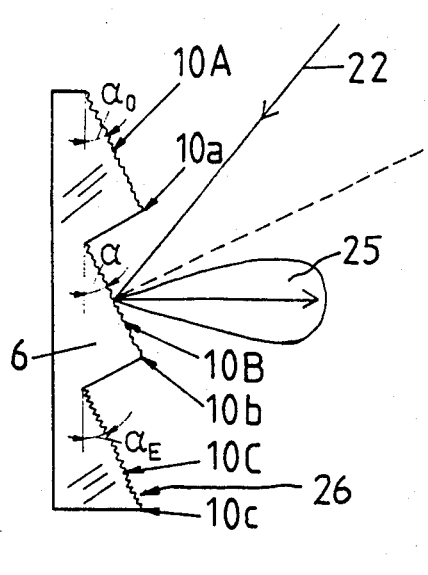
FIGS. 7 and 8 are cross-sectional views of further illustrative embodiments of a reflector according to the invention.

In FIG. 7, the example of a reflector 6 according to the invention already shown in FIG. 2 is shown again, on an enlarged scale and in all details. The surface strips 10A to 10C, which possess a diffusely reflecting surface 26, form an angle of inclination $\alpha$ with the rear side of the reflector 6, which side lies in the display plane. The effect of the present invention can be further optimized if these angles $\alpha$ are adjusted to the conditions typical of the particular application of the display device. According to the invention it is this context necessary to take into account the expected height of the eye of the observer 8 relative to the display device, on the one hand, and the position of the light source, on the other hand. How the angles $\alpha$ are to be determined for a particular concrete application is explained below in connection with FIG. 9.

In certain cases it is also advantageous to vary the angle of inclination $\alpha$, starting from an initial value $\alpha_o$ of the outermost surface strip 10A and extending to a final value of $\alpha_E$ for the last surface strip 10C. Preferably, the angle of inclination $\alpha$ decreases monotonously from its initial value $\alpha_o$ to its final value $\alpha_E$, so that the surface strips in effect form a convex surface. This advantageously in particular further increases the angle of viewing. The individual deviations of the angle of inclination $\alpha$ are in general slight and amount to at most +20% of the initial angle $\alpha_o$.

Figure 8:
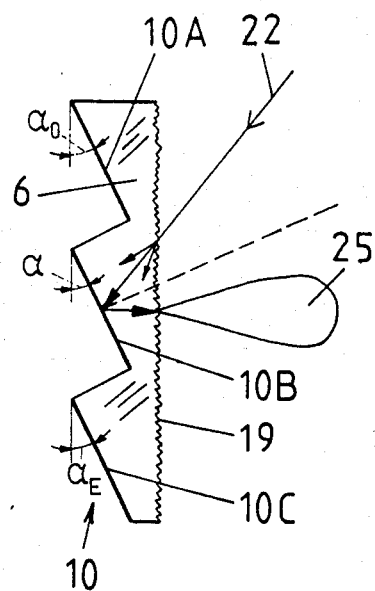

FIG. 8 shows a further example of a reflector 6 according to the invention, which however exhibits the structure 10 according to the invention on the side facing away from the rear plate 3, as indicated by the light beam 22 incident from above onto the front side. This reflector 6 is transparent on the side facing the rear plate 3 and furthermore possesses, on this side, a diffusely scattering surface 19, which is indicated by the fact that the incident light beam 22, on striking the reflector 6, is split up. The splitup beams are then reflected on the rear side of the reflector 6, which is why here at least the surface strips 10A to 10C must be of reflecting construction. After having been reflected at the surface strips 10A to 10C, the reflected beams are again scattered, on issuing from the reflector 6, as indicated by the cone of rays 25. With the embodiment of the invention shown here, particularly uniformly illuminated displays 1 can be achieved.

Figure 9:
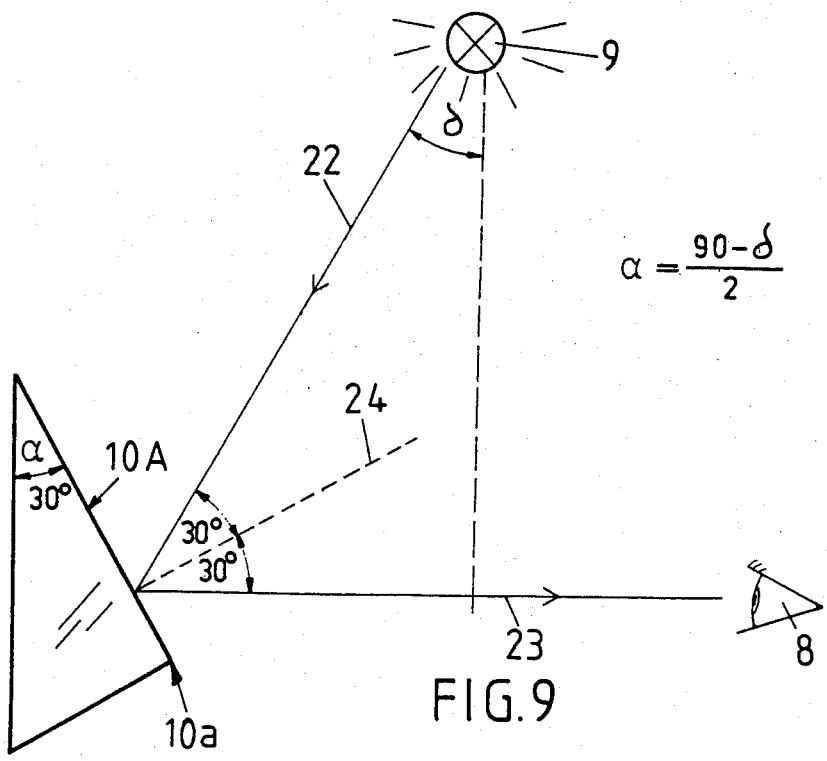
FIG. 9 is a sketch for calculating the angle α which co-determines the shape of the reflector according to the invention.

FIG. 9 shows a sketch for determining the angle of inclinatin $\alpha$. For simplicity, only one surface strip 10A of the structure 10 according to the invention is shown in this figure. Assume that the display 1 is to be used, for example, in a control room and is located, as is also shown in FIG. 1, vertically mounted in a display instrument, and horizontal relative to the eye of the observer 8. The angle between the direction of the light beam 22 incident from the light source onto the display 1, and the vertical display plane, is marked $\delta$. In that case $\alpha = (90° - \delta)/2$ if the greater part of the reflected light is to pass directly, in the form of the reflected light beam 23, into the eye of the observer 8. For example $\alpha$ and $\delta$ are each 30°. For a particular display, the angles $\alpha$ can, depending on the application, have values deviating therefrom, but deviations of more than $\pm 10°$ are inappropriate. The method described can, in its general sense, also be used for illumination with daylight. In FIG. 9, 24 indicates the perpendicular to the surface strip.

The invention in not restricted only to stationary applications in the vertical position, but can also be used with advantage in stationary instruments where the position of the diplay relative to the light and to the observer is substantially fixed. This is because, due to the scattering surfaces 19, 26 provided according to the invention, the display 1 becomes substantially independent of the particular angle of incidence of the light and of the angle of viewing of the observer 8, at least as far as the height of the observer relative to the display is concerned.

The refector 6 according to the invention is advantageously manufactured by milling or embossing the structure 10 into a sheet of thermoplastic. The reflector 6 can also be manufactured by injecting a thermoplastic which has been rendered capable of flow by heating, into a mould which exhibits the structure 10. The surface strips 10A to 10K are preferably made semi-transparent, or completely reflecting, by stepwise vapor deposition of metals, such as, for example, aluminum.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electroptical display with a vertical display plane, composed of parallel and planar front and rear cell plates, each of which is provided with electrode coatings, and between which is disposed a diplay medium, at least said front plate being transparent, comprising:

a thermoplastic reflector located on said rear cell plate and formed with a light reflecting structure comprising plural reflecting strips each inclined at an angle with respect to the plane of said plates and extending rectilinearly in at most two different directions over the surface of the reflector, said reflecting strips having reflecting surfaces which look upwardly to reflect light in a direction generally perpendicular to said front and rear cell plates so that ambient light from above the display is reflected to an observer located in front of the display, and the surface of said reflector adjacent said rear cell plate being at least partially diffusely reflecting;

wherein said angle $\alpha$ has a value in the range $20° \leq \alpha \leq 40°$.

2. An electro-optic display according to claim 1, further comprising:
said angle of inclination $\alpha$ said plural reflecting strips being the same for each of said strips.

3. An electro-optical display according to claim 1, further comprising:
said angle of inclination $\alpha$ of said plural reflecting strips increasing and decreasing progressively between outermost strips with the angle $\alpha$ varying at most by $\pm 20\%$.

4. An electro-optical display according to claim 3, wherein the angle of inclination $\alpha$ varies between 24° and 36°.

5. A display according to claims 1, 2, 3 or 4, further comprising said surface strips extending in two different directions defining an angle ($\beta$) less than 180° with respect to one another.

6. A display according to claims 1, 2 or 3 wherein the reflecting surface strips are semi-transparent.

7. A display according to claims 1, 2 or 3 wherein the reflecting surface strips are diffusely reflecting.

8. A display according to claims 1, 2 or 3, wherein the reflector is at least partially transparent, and the reflecting surface strips are present on the rear of the reflector.

9. A display according to claims 1, 2 or 3, with a vertical display plane, wherein the surface strips extend in only a horizontal direction.

10. A display according to claims 1, 2 or 3, with a vertical display plane, wherein the surface strips extend in two different directions which are both inclined to the horizontal at the same angle ($\delta$).

* * * * *